(12) United States Patent
Malki

(10) Patent No.: US 12,370,981 B2
(45) Date of Patent: Jul. 29, 2025

(54) AUTOMATED CAR WASH SYSTEM, CAR WASH CONVEYOR SYSTEM AND AUTOMATED CAR WASH METHOD

(71) Applicant: ABA Highpoint LLC, Yonkers, NY (US)

(72) Inventor: Shlomo Malki, Scarsdale, NY (US)

(73) Assignee: ABA Highpoint LLC, Yonkers, NY (US)

( * ) Notice: Subject to any disclaimer, the term of this patent is extended or adjusted under 35 U.S.C. 154(b) by 703 days.

(21) Appl. No.: 17/651,489

(22) Filed: Feb. 17, 2022

(65) Prior Publication Data

US 2023/0256943 A1 Aug. 17, 2023

(51) Int. Cl.
*B60S 3/00* (2006.01)
*B65G 17/12* (2006.01)
*G05B 19/4155* (2006.01)

(52) U.S. Cl.
CPC .............. *B60S 3/004* (2013.01); *B65G 17/12* (2013.01); *G05B 19/4155* (2013.01); *B65G 2812/02267* (2013.01); *G05B 2219/50393* (2013.01)

(58) Field of Classification Search
CPC ........ B60S 30/004; B60S 3/004; B65G 17/12; B65G 2812/02267; B65G 19/265; G05B 19/4155; G05B 2219/50393
See application file for complete search history.

(56) References Cited

U.S. PATENT DOCUMENTS

| | | | |
|---|---|---|---|
| 3,260,219 A * | 7/1966 | Vani | B60S 3/004 105/27 |
| 3,526,193 A * | 9/1970 | Vani | B60S 3/004 104/247 |
| 3,554,133 A * | 1/1971 | De Angelis | B60S 3/004 198/728 |
| 3,557,705 A | 1/1971 | Gusse et al. | |
| 3,693,392 A * | 9/1972 | Watson | B61B 10/046 104/172.3 |
| 4,266,482 A | 5/1981 | Barber | |
| 4,576,098 A * | 3/1986 | Belanger | B65G 19/02 104/172.3 |
| 4,864,936 A * | 9/1989 | Rietsch, Jr. | B62D 65/18 198/732 |
| 6,186,073 B1 * | 2/2001 | Reitsch, Jr. | B60S 3/004 104/162 |
| 8,028,628 B2 * | 10/2011 | Ennis | B60S 3/004 104/162 |

* cited by examiner

*Primary Examiner* — Michael Collins
(74) *Attorney, Agent, or Firm* — Amster, Rothstein & Ebenstein LLP

(57) ABSTRACT

A car wash vehicle conveyor system including a lower track, an upper track, and an intermediate track positioned between the lower and upper tracks. The upper track includes laterally spaced and parallel raised portions. An endless chain extends around the lower track and the intermediate track. The endless chain is connected around at least one drive sprocket so that rotation of the at least one drive sprocket results in lateral movement of the endless chain around the lower and intermediate tracks. A plurality of push roller assemblies are attached to the endless chain. Each push roller assembly is sized so that, when the push roller assembly is directed onto the upper track, the corresponding rollers travel along the upper track between the raised portions. In embodiments, the conveyor system is part of an automated car wash system.

8 Claims, 21 Drawing Sheets

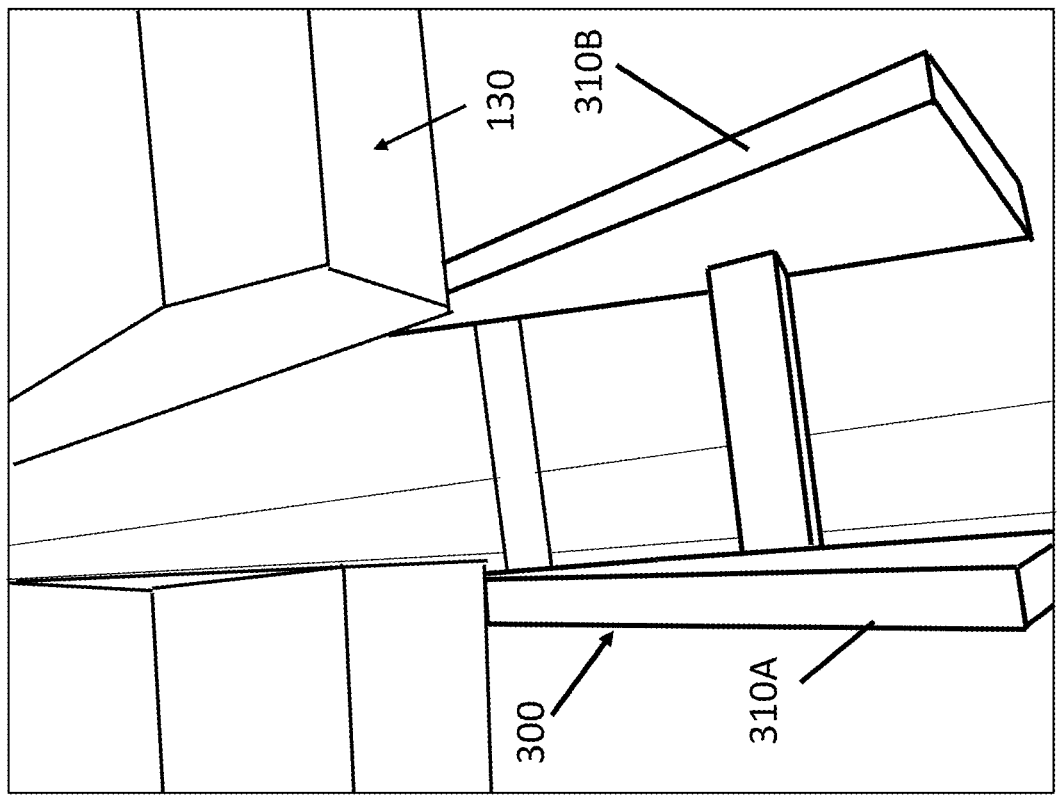

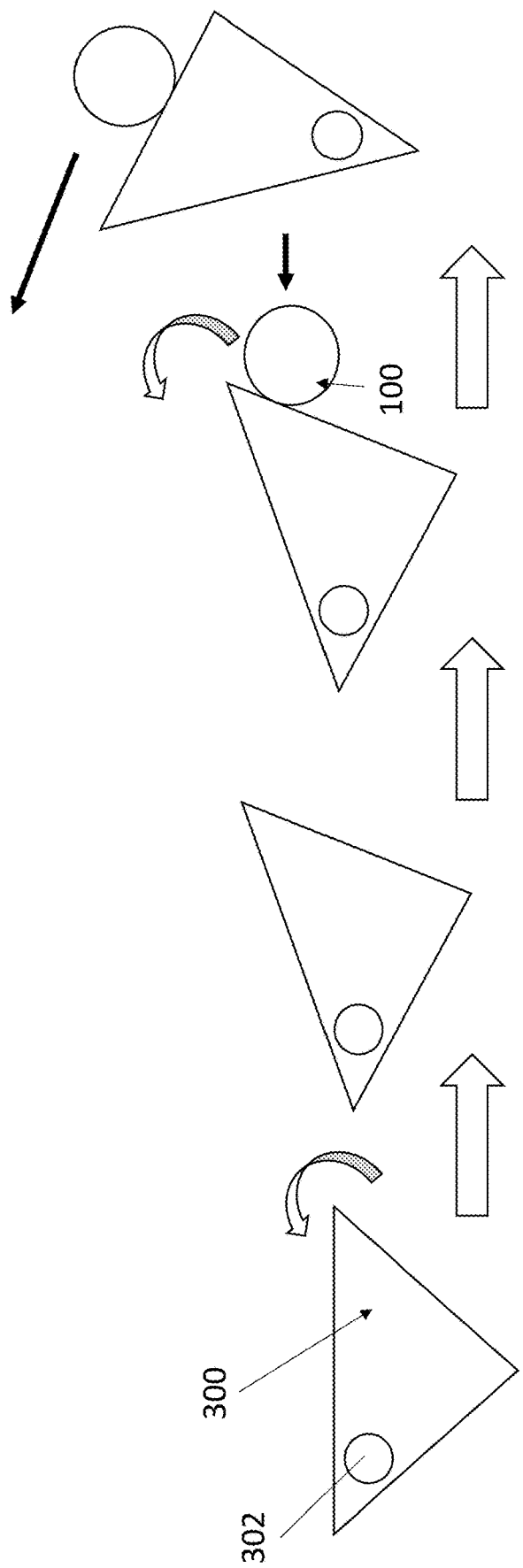

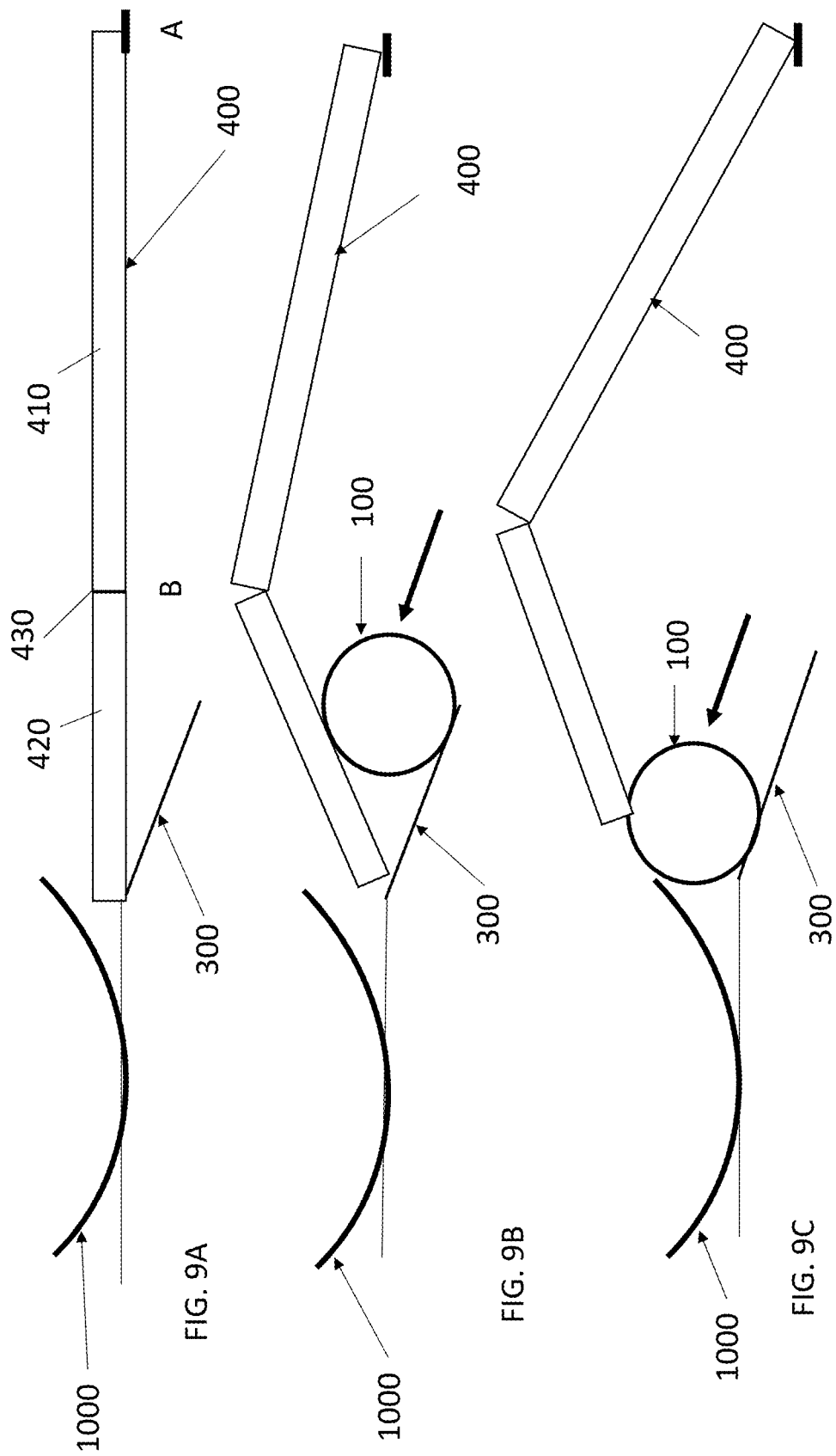

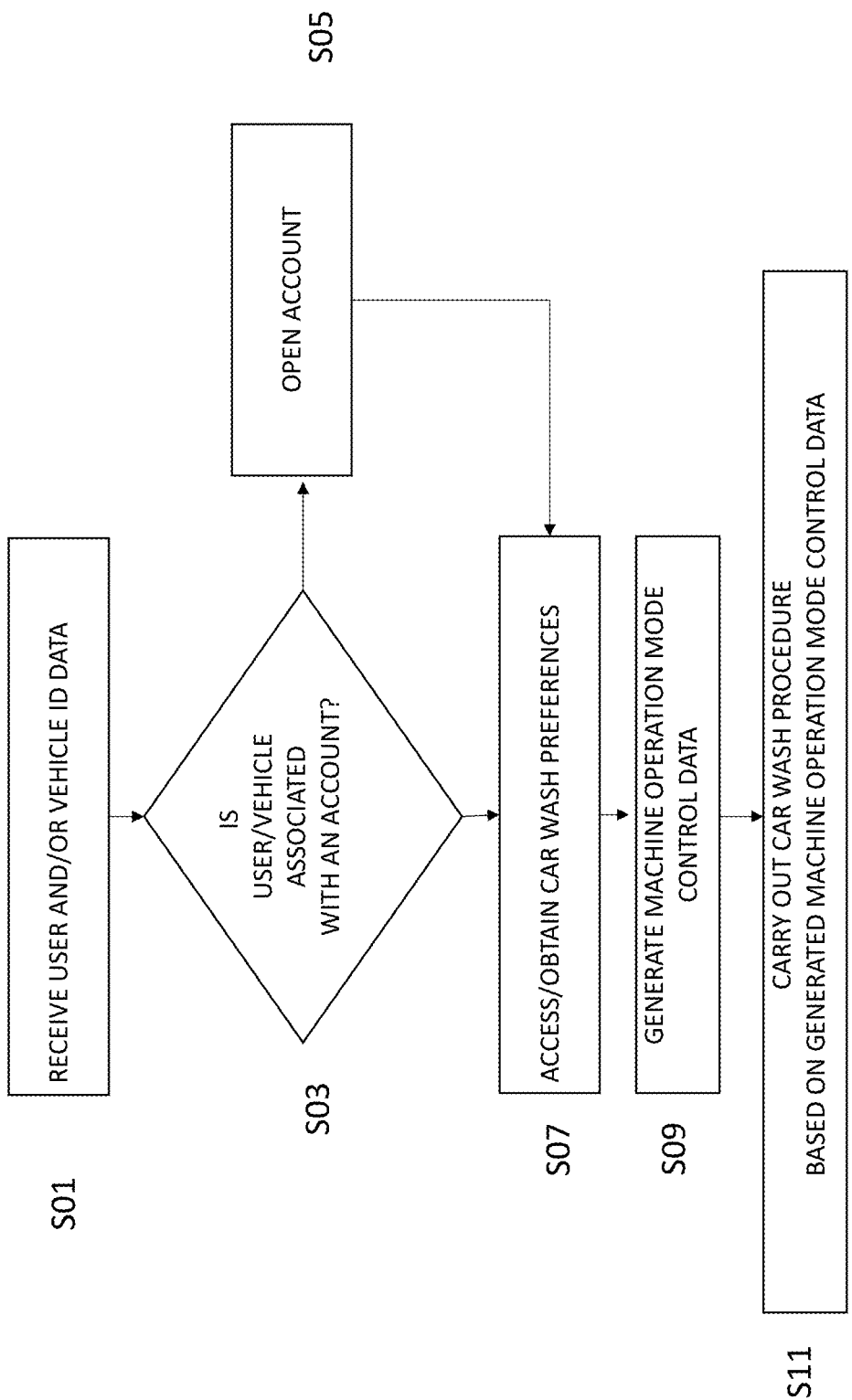

AUTOMATED CAR WASH SYSTEM, CAR WASH CONVEYOR SYSTEM AND AUTOMATED CAR WASH METHOD

FIELD OF THE INVENTION

The present invention generally relates to automated car wash systems, and more particularly to specific components of such systems, such as, for example, conveyors, roller assemblies, chain drives and vehicle tracks, to name a few.

BACKGROUND

Automatic car washes use conveyors for pulling each car along a track extending through an array of car washing equipment disposed along the conveyor. One design which has been widely adopted uses a series of roller assemblies attached to an endless recirculated chain extending around structure extending the length of the conveyor.

More specifically, conventional vehicle conveyors for car washes are mounted in a pit, typically formed in concrete. The conveyor system typically has three tiers, including an upper track, a lower track, and a return portion. The upper track carries the wheels on one side of a vehicle to be washed. The lower track carries dollies which are mounted on and propelled by a chain, such as, for example, a log chain. Conventional dollies include sets of rollers configured to push the tires on one side of a vehicle. The chain has an upper flight which moves in the downstream direction (i.e., the direction of movement of the vehicle being washed) and a lower flight which moves in an upstream direction (i.e., the direction of movement opposite to that of the vehicle being washed). The dollies roll on the return portion of the conveyor system as they are carried by the lower flight of the chain in the upstream direction.

The dollies normally ride on the lower track and return portion, beneath the upper track, so they cannot pose a danger to workers in the car wash. However, when a vehicle is to be pushed, a ramp is raised to shunt the upstream or rear portion of a dolly to the upper track, and a lid is also raised at this time to provide space for this movement. The rear portion of the dolly then pushes the vehicle through the car wash and then is returned to the lower track.

Conventional vehicle conveyor systems such as that described above are disclosed in, for example, U.S. Pat. Nos. 3,557,705, 4,266,482, and 6,186,073, to name a few, the contents of which are incorporated herein by reference in their entirety.

There is a continuing need for improved car wash conveyors and automated car wash systems.

SUMMARY OF THE INVENTION

An object of the present invention is to provide an improved car wash conveyor system. In particular, in embodiments, a conveyor system includes one or more of the following features: 1) push roller assemblies with specific dimensions that allow the push roller assemblies to roll between raised portions of an upper conveyor track; 2) a sprocket with flanges that hold an endless chain in position on the sprocket; 3) a trapdoor assembly with double hinges that allow access to internal components of the conveyor system and which allow the push roller assemblies access to the upper conveyor track even if a vehicle is stopped too close to allow for normal operation of the trapdoor assembly; and 4) a ramp that pivots upwards to guide the push roller assemblies onto the upper conveyor track. Particularly when provided in combination, these features provide improvements to conventional car wash conveyor systems in terms of stability and overall efficiency.

Another object of the present invention is to provide a car wash system that is fully automated by providing a networked computer system made up of computer-implemented components, such as, for example, user kiosks, a vision system, and a car wash station control system, to name a few.

A car wash vehicle conveyor system according to an exemplary embodiment of the present invention comprises: a lower track, an upper track, and an intermediate track positioned between the lower and upper tracks, the upper track comprising laterally spaced and parallel raised portions; an endless chain extending around the lower track and the intermediate track; at least one drive sprocket around which the endless chain is connected so that rotation of the at least one drive sprocket results in lateral movement of the endless chain around the lower and intermediate tracks; and a plurality of push roller assemblies each attached to the endless chain and comprising at least one pair of rollers, each push roller assembly being sized so that, when the push roller assembly is directed onto the upper track, the corresponding rollers travel along the upper track between the raised portions.

In an exemplary embodiment each push roller assembly has a width measured from an outer edge of one roller to an outer edge of another roller of the at least one pair of rollers, and the width is ten inches.

In an exemplary embodiment each push roller assembly comprises at least one pair of collars, and each collar is configured to hold a corresponding one of the rollers on the push roller assembly.

In an exemplary embodiment each push roller assembly is sized so that, when the push roller assembly is directed onto the upper track, each collar rides on top of the raised portions of the upper track.

In an exemplary embodiment the system further comprises a ramp having a raised configuration in which the plurality of push roller assemblies are directed by the ramp onto the upper track and a lowered configuration in which the plurality of push roller assemblies are directed by the ramp onto the intermediate track.

In an exemplary embodiment the system further comprises an actuator that rotates the ramp to an intermediate configuration between the lowered and raised configuration.

In an exemplary embodiment the ramp is further rotated from the intermediate configuration to the raised configuration due to contact of one of the plurality of push roller assemblies with the ramp.

In an exemplary embodiment the sprocket comprises a pair of flanges and the endless chain is held between the pair of flanges.

In an exemplary embodiment the system further comprises a trapdoor assembly disposed above an entry point of the plurality of push roller assemblies from the intermediate track to the upper track.

In an exemplary embodiment the trapdoor assembly comprises a rear door and a front door disposed downstream from the rear door.

In an exemplary embodiment the trapdoor assembly comprises a double hinge between the front and rear doors.

A method in accordance with an exemplary embodiment of the present invention comprises: receiving, at an automated car wash computer system, at least one of user or vehicle identification data; determining, by the automated car was computer system, whether a user account is associated with the at least one of the user or vehicle identification data; upon the condition that it is determined a user account is not associated with the at least one of the user or vehicle identification data, requesting, by the automated car wash computer system, opening of a new user account; upon the condition that it is determined a user account is associated with the at least one of the user or vehicle identification data, accessing, by the automated car wash computer system, the user account; accessing, by the automated car wash computer system, default car wash preference data associated with the user account or new user account; receiving, by the automated car wash computer system, updated car wash preference data relative to the default car wash preference data; generating, by the automated car wash computer system, based on the updated car wash preference data, machine operation mode control data associated with one or more machines of an automated car wash station; and sending, by the automated car wash computer system, the machine operation mode control data to the one or more machines so that a car wash process is carried out on a vehicle in accordance with the car wash preference data.

In an exemplary embodiment the step of receiving at least one of user or vehicle identification data comprises providing, by the automated car wash computer system, a graphical user interface for input of at least one of user or vehicle identification data.

In an exemplary embodiment the graphical user interface is provided at a kiosk.

In an exemplary embodiment the graphical user interface is provided at a user application installed on a portable device associated with a user.

In an exemplary embodiment the step of receiving comprises reading, by the automated car wash computer system, a barcode displayed on a portable device associated with a user.

In an exemplary embodiment the user preference data comprises data associated with one or more of the following types of information: damage to the user's vehicle; preferred car wash services; type of vehicle; and configuration of the vehicle.

In an exemplary embodiment the step of receiving updated car wash preference data comprises receiving the updated car wash preference data through the graphical user interface provided at the user application.

In an exemplary embodiment the machine operation mode control data comprises data associated with one or more of the following types of information: deactivation of at least one of the one or more machines; modification of operation of at least one of the one or more machines; and activation of at least one of the one or more machines to accommodate a requested car wash service.

These and other features and advantages of the present invention will be presented in more detail in the following detailed description and the accompanying figures which illustrate by way of example principles of the invention.

DESCRIPTION OF THE DRAWINGS

Various exemplary embodiments of this invention will be described in detail, with reference to the following figures, wherein:

FIGS. 6A-6C show a ramp used in a conveyor system according to an exemplary embodiment of the present invention;

FIGS. 7A-7D are representative diagrams showing motion of a ramp from a lowered position to a raised position according to an exemplary embodiment of the present invention;

FIG. 9A-9C are representative diagrams showing pivoting motion of a ramp according to an exemplary embodiment of the present invention;

FIG. 15 is a process flow of a method of automatically washing a car in an automated car wash system according to an exemplary embodiment of the present invention.

DETAILED DESCRIPTION

In embodiments, the automated car wash system of the present invention seeks to address the technological problem of how to automatically access and/or capture information pertaining to a vehicle and dynamically adjust a car wash process for that vehicle based on the captured information. Conventionally, car wash systems apply standard car wash services to vehicles, with rigid adherence to specific levels of service, such as "standard", "intermediate" and "deluxe" packages. Such systems do not take into account specific needs or requirements of a customer or a vehicle associated with a customer. For example, a damaged vehicle may require special care during the car wash process to avoid further damage. Conventional car wash systems also suffer from a technological drawback in that they are not able to automatically detect vehicle characteristics, such as, for example, vehicle type (e.g., sports car, hatchback, coupe, bus, truck, etc.), vehicle configuration (e.g., rear-wheel drive, front-wheel drive, etc.) and vehicle damage (e.g., broken side mirror, broken window glass, broken headlight, etc.) so that the car wash process for that particular vehicle may be automatically modified to accommodate for the vehicle characteristics.

In exemplary embodiments, the present invention addresses this technological barrier by providing a technological solution in the form of an automated car wash system including components, such as, for example, user kiosks, a vision system, and a car wash station control system, that in combination are able to automatically capture customer and/or vehicle information and dynamically adjust a car wash process based on the captured information. In embodiments, customer and/or vehicle information data may be input to the automated system through a user application installed on a customer's portable device (e.g., cell phone, tablet, smart phone, laptop, etc.), at a user kiosk, and/or through the visions system, and such information data may be used by the car wash station control system to make appropriate adjustments to the car wash process for the customer's vehicle. Such adjustments may not adhere to specific levels of service, but instead may be fully modifiable depending on the needs of the customer and/or the customer's vehicle.

Figure 1:
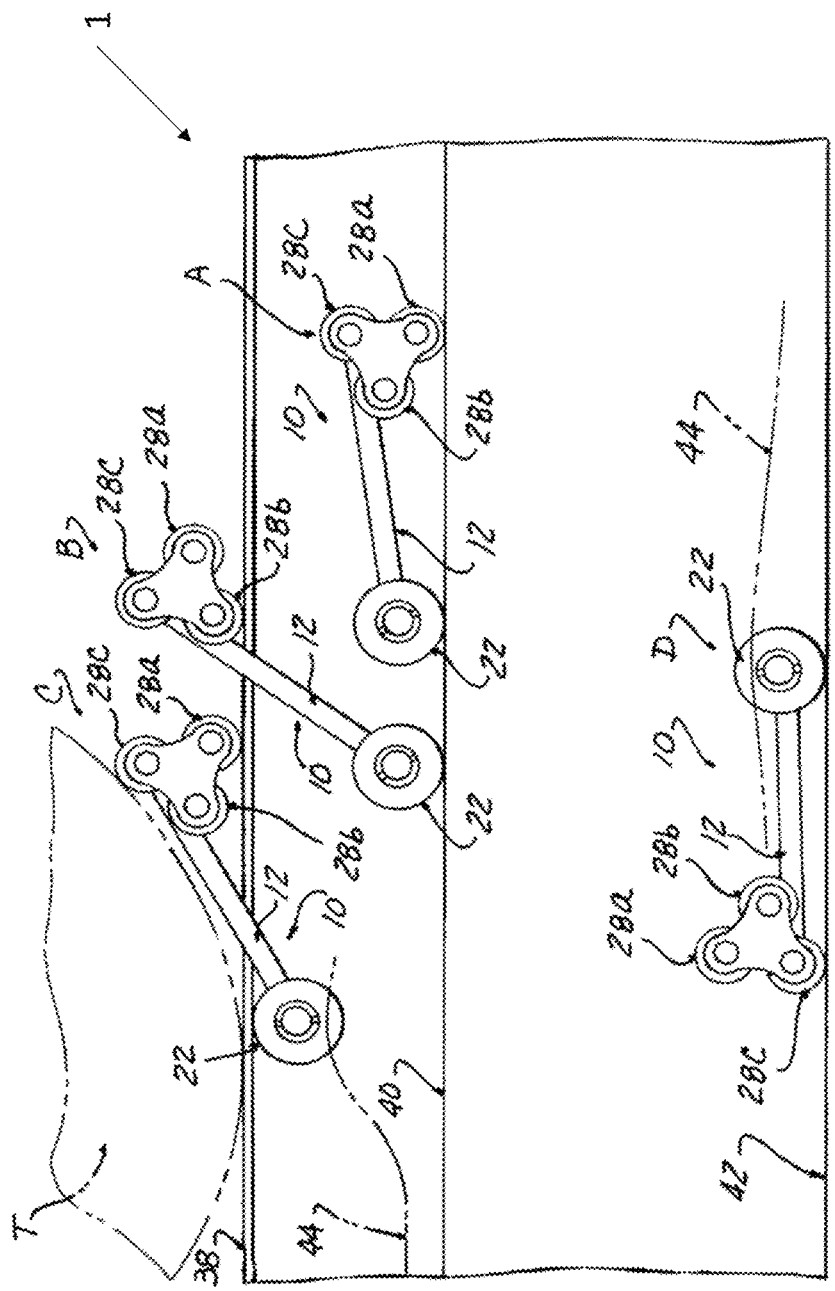
FIG. 1 is a representative diagram of a conventional car wash conveyor.
Figure 2:
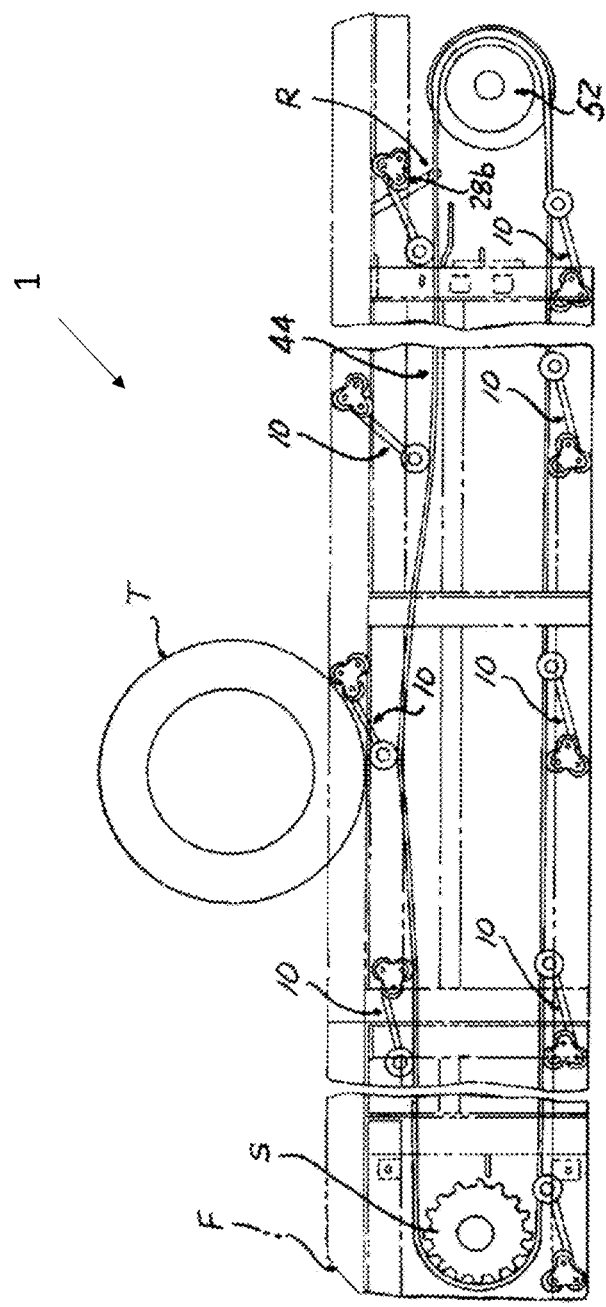
FIG. 2 is a representative diagram of a conventional car was conveyor.

FIGS. 1 and 2 illustrate a conventional vehicle conveyor system, generally designated by reference number 1, that may be modified to include one or more of the components in accordance with exemplary embodiments of the present invention. Specifically, FIGS. 1 and 2 show several positions assumed by a roller assembly 10 in traversing car wash conveyor tracks. The conveyor system 1 has a multilevel track frame F providing three track levels, an upper track 38 on which the car tires T roll when engaged by a pusher roller set 12 of the roller assembly 10, an intermediate track 40 which receives the roller assemblies 10 when the pusher sets 12 are not ramped up to upper track 38; and a lower or return track 42 down which the roller assemblies 10 pass in being returned to the forward end of the conveyor.

The roller assemblies 10 are connected to an endless chain 44 circulating along the intermediate and lower tracks 40, 42 and passing around sprockets S1, S2 at either end of the conveyor. One sprocket S1 may be a drive sprocket, while the other sprocket S2 may be a take up or return sprocket. When a roller assembly 10 is to be activated for engagement with a vehicle tire, a pivoting ramp R is swung up to engage one of roller pairs 28A, 28B, 28C of pusher roller set 14. This causes the pusher roller set 14 to be cammed up from the idle position "A" to the upper track 38, where it assumes the activated but unengaged position "B". Upon engaging a vehicle tire T, the idler rollers 22 are pulled up against the undersurface of upper track 38 to assume position "C", causing the roller bar 12 to be more inclined due to the resistance created by the tire T. Several unengaged roller assemblies 10 may be caused to be swung up behind an engaged roller assembly 10 as a safety measure. Thus, each roller assembly 10 will have a substantial period of use traversing the upper track 38 while not engaging a vehicle tire T.

At the end of the conveyor, the roller assemblies 10 proceed back along the lowest track 42 in a reverse position "D".

Figure 3:
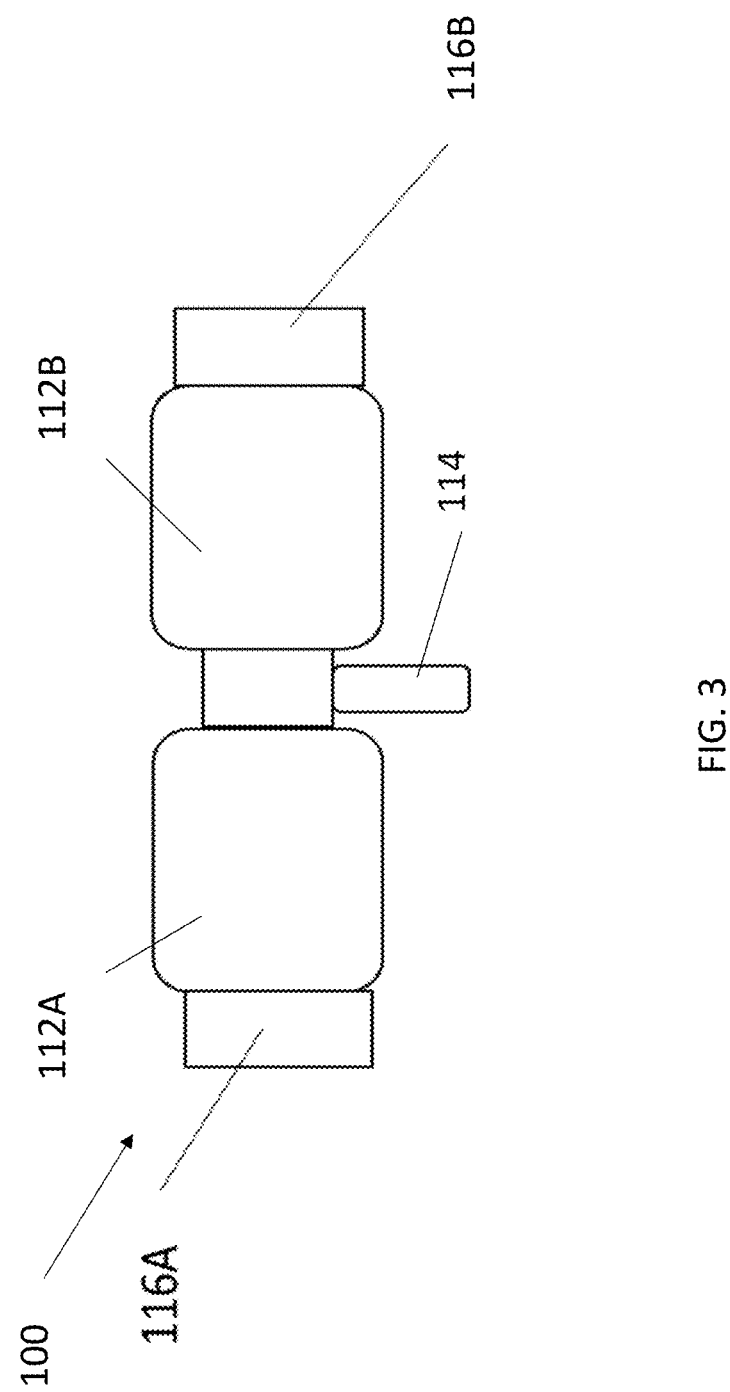
FIG. 3 shows a push roller assembly according to an exemplary embodiment of the present invention.

FIG. 3 shows a push roller assembly, generally designated by reference number 100, according to an exemplary embodiment of the present invention. The push roller assembly 100 includes a set of two rollers 112A, 112B that may be made of plastic material, such as, for example, ultra-high molecular weight polyethylene (UHMW). The rollers 112A, 112B are rotatably mounted on a shaft 118 (FIG. 4) and held onto the shaft 118 by a set of corresponding collars 116A, 116B. The roller assembly 100 also include a link 114 extending from the shaft and configured for removeable attachment to a chain of the car wash conveyor system.

Figure 4A:
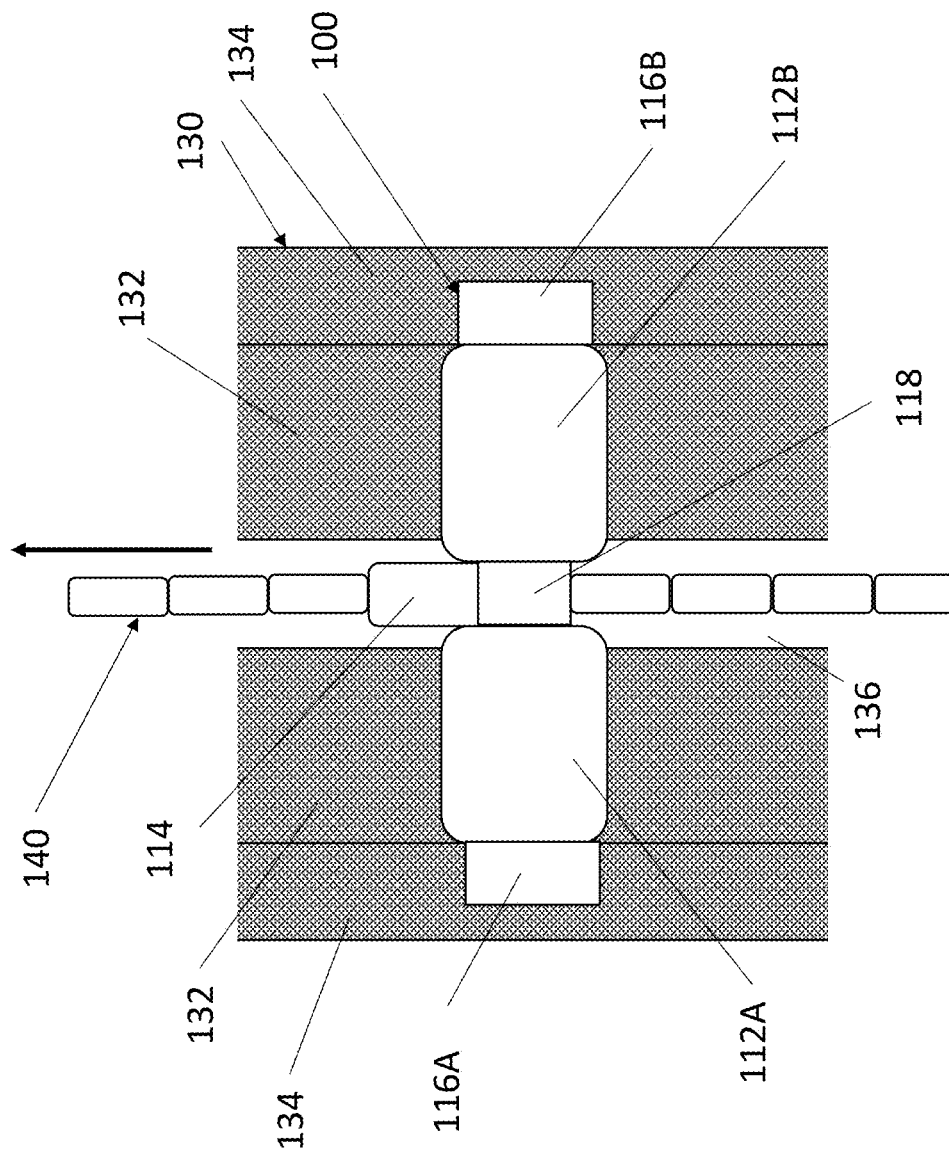
FIG. 4A is a representative diagram of a push roller assembly on a conveyor track according to an exemplary embodiment of the present invention.
Figure 4B:
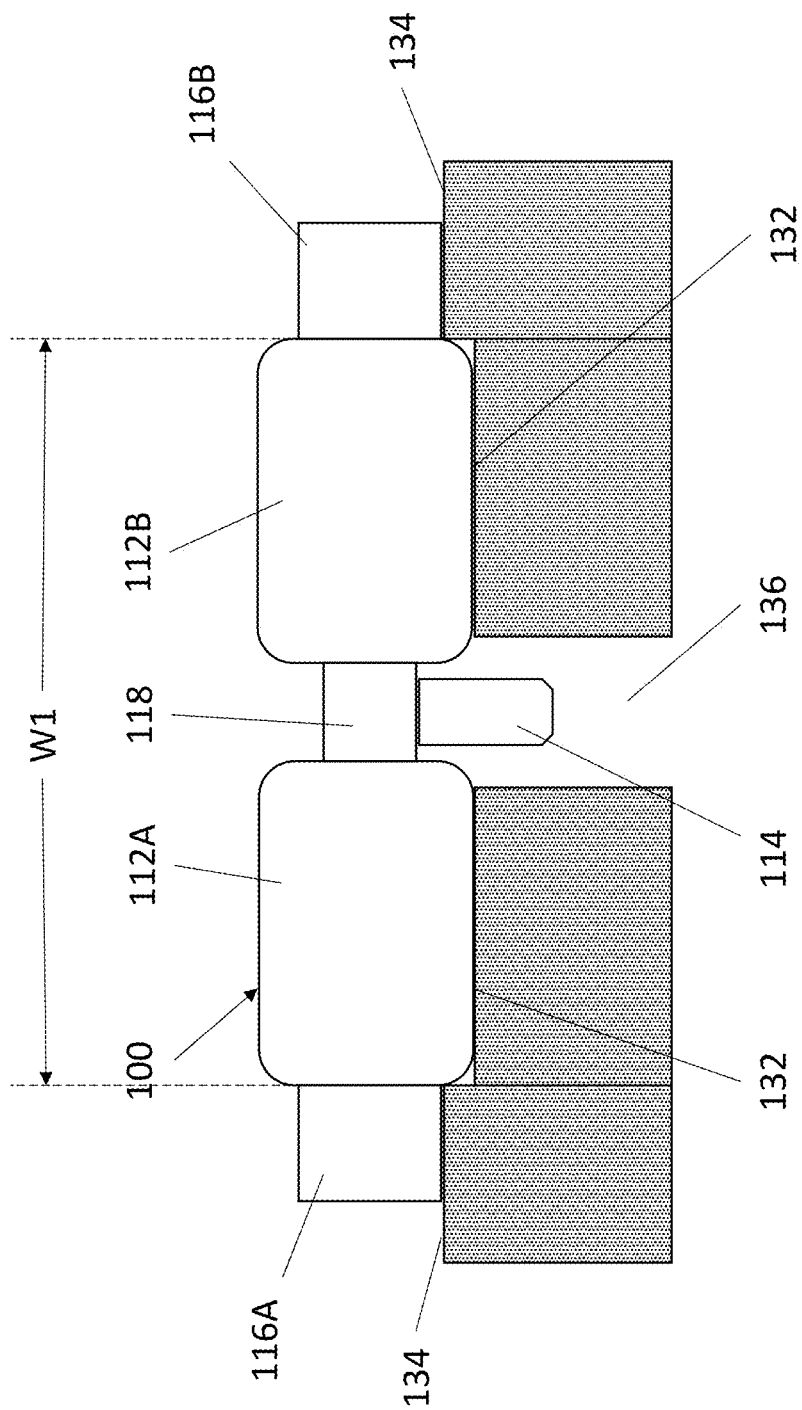
FIG. 4B is a cross-sectional view of a push roller assembly on a conveyor track according to an exemplary embodiment of the present invention.

FIGS. 4A and 4B show the push roller assembly 100 traveling on the upper track 130 of a car wash conveyor system in accordance with an exemplary embodiment of the present invention. The link 114 of the push roller assembly 100 is attached to the endless chain 140 of the conveyor system. The push roller assembly 100 is thus pulled by movement of the endless chain 140 in the downstream direction into engagement with the rear tire of a vehicle.

The upper track 130 includes an upper surface with base portions 132, raised portions 134 that extend above the base portions 132, and a slot 136 between the base portions 132. The rollers 112A, 112B are configured to roll on the base portions 132, while the link 114 extends into the slot 136 and into engagement with the endless chain 140. As shown in FIG. 4B, the width W1 of the push roller assembly 100 from an outer end of roller 112A to an outer end of roller 112B is such that that the rollers 112A, 112B are able to roll on the base portions 132 between the raised portions 134 while the collars 116A, 116 roll on the raised portions 134. In this regard, in accordance with an exemplary embodiment of the present invention, the width W1 is approximately the same as the width between the raised portions 134. In a specific exemplary embodiment, the width W1 is 10 inches. This configuration allows for improved guidance of the push roller assembly 100 within the upper track 130 and a more stable push of the vehicle wheels.

In contrast to the roller assembly 10 described above, the push roller assembly 100 does not have idler rollers, includes only one pair of push rollers, and is configured to directly attach to the conveyor chain via the link 114. However, it should be appreciated that the push roller assembly 100 is not limited to the configuration shown and described herein, and in other exemplary embodiments the push roller assembly 100 may include idler rollers and/or any number of rollers and/or pairs of rollers, where the push roller assembly is sized such that the rollers travel between the raised portions of the upper track of the car wash conveyor system and the collars roll on top of the raised portions of the upper track.

Figure 5A:
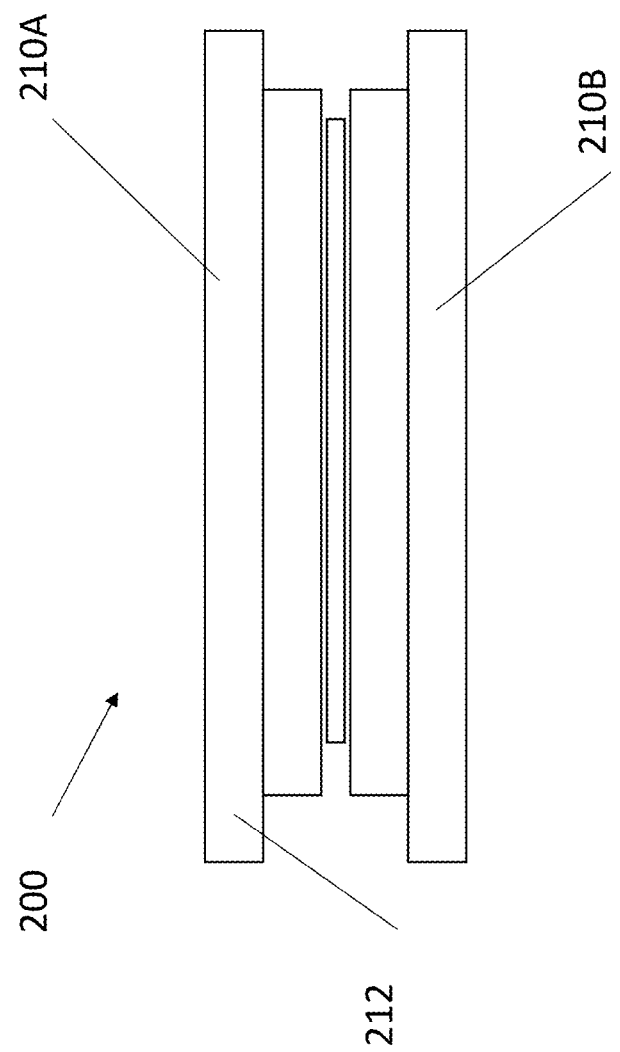
FIGS. 5A and 5B show a sprocket used in a conveyor system according to an exemplary embodiment of the present invention.
Figure 5B:
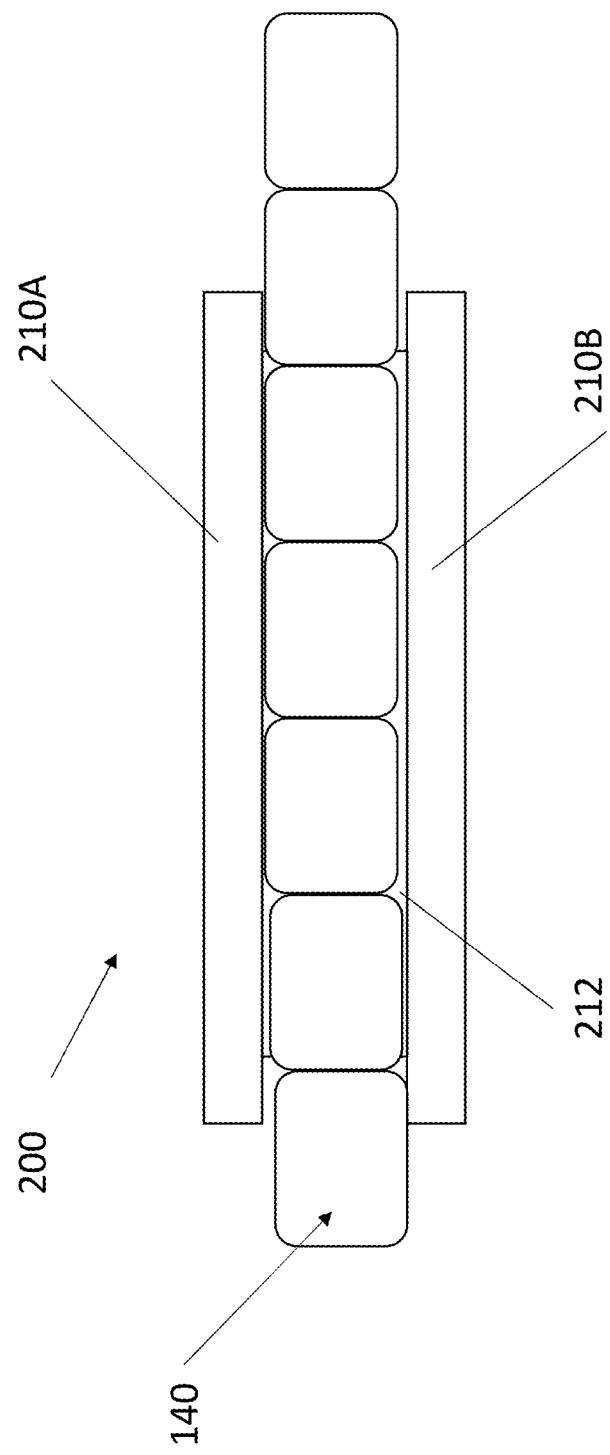
Figure 5C:
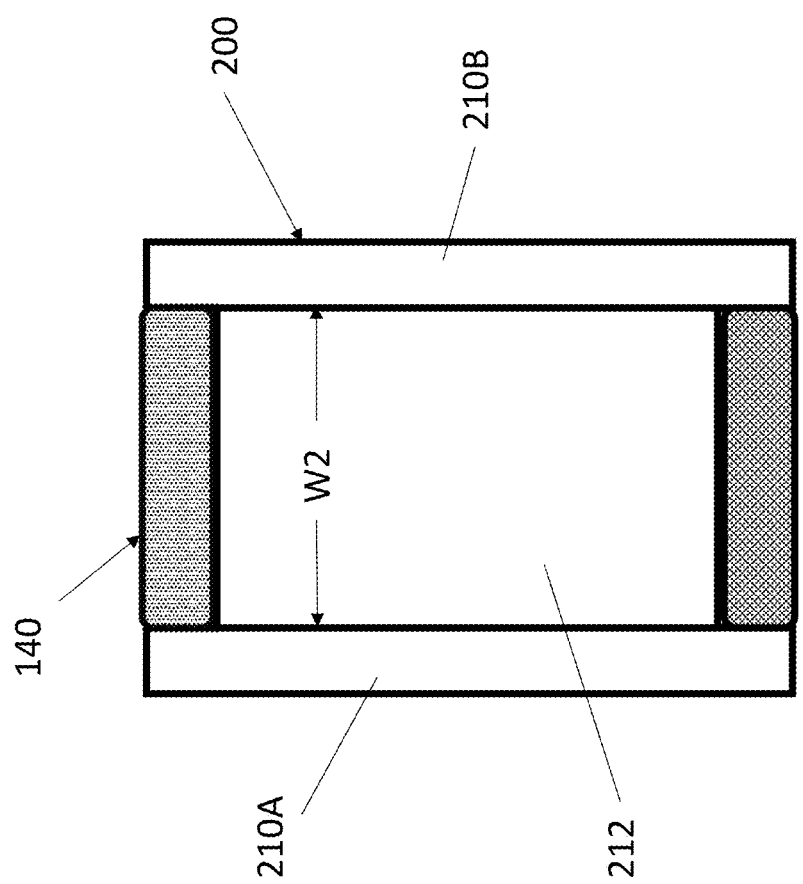
FIG. 5C is a cross-sectional view of an endless chain disposed on sprocket of a conveyor system according to an exemplary embodiment of the present invention.

FIGS. 5A-5C show a sprocket, generally designated by reference number 200, according to an exemplary embodiment of the present invention. The sprocket 200 is configured for use with a car wash conveyor system, such as the systems described herein. The sprocket 200 includes a hub 212 and flanges 210A, 210B, one on each side of the hub 212. As shown in FIGS. 5B and 5C, the width W2 of the hub 212 is approximately the same as that of the links of the endless chain 140, so that as the sprocket 200 rotates, the flanges 210A, 210B hold the chain 140 firmly on the sprocket 200. This construction prevents the chain 140 from slipping off the sprocket or otherwise coming out of alignment relative to the desired chain path.

As mentioned previously, a moveable ramp is conventionally used to direct the pusher rollers onto the upper track of the conveyor system. An example of such a ramp is disclosed in, for example, U.S. Pat. No. 4,864,936, the contents of which are incorporated herein by reference in their entirety. Such ramps typically include laterally spaced ramp members attached to a pivotally mounted cross shaft. The cross shaft is selective rotated by a rotary actuator to place the ramp in the raised or lowered configuration. A trap door is typically positioned over the roller entrance point onto the upper track so that a vehicle can first pass over the trap door before the pusher roller proceeds up the ramp and then out of the trapdoor and into position behind the vehicle wheel.

FIG. 6A shows a ramp, generally designated by reference number 300, according to an exemplary embodiment of the present invention. The ramp 300 includes two ramp members 310A, 310B that are laterally spaced and parallel to one another. FIG. 6A shows the ramp in the lowered position, allowing the push roller assemblies to proceed without entering the upper track 130. This configuration would be appropriate, for example, when no vehicles are traveling over the upper track 130.

Figure 6B:
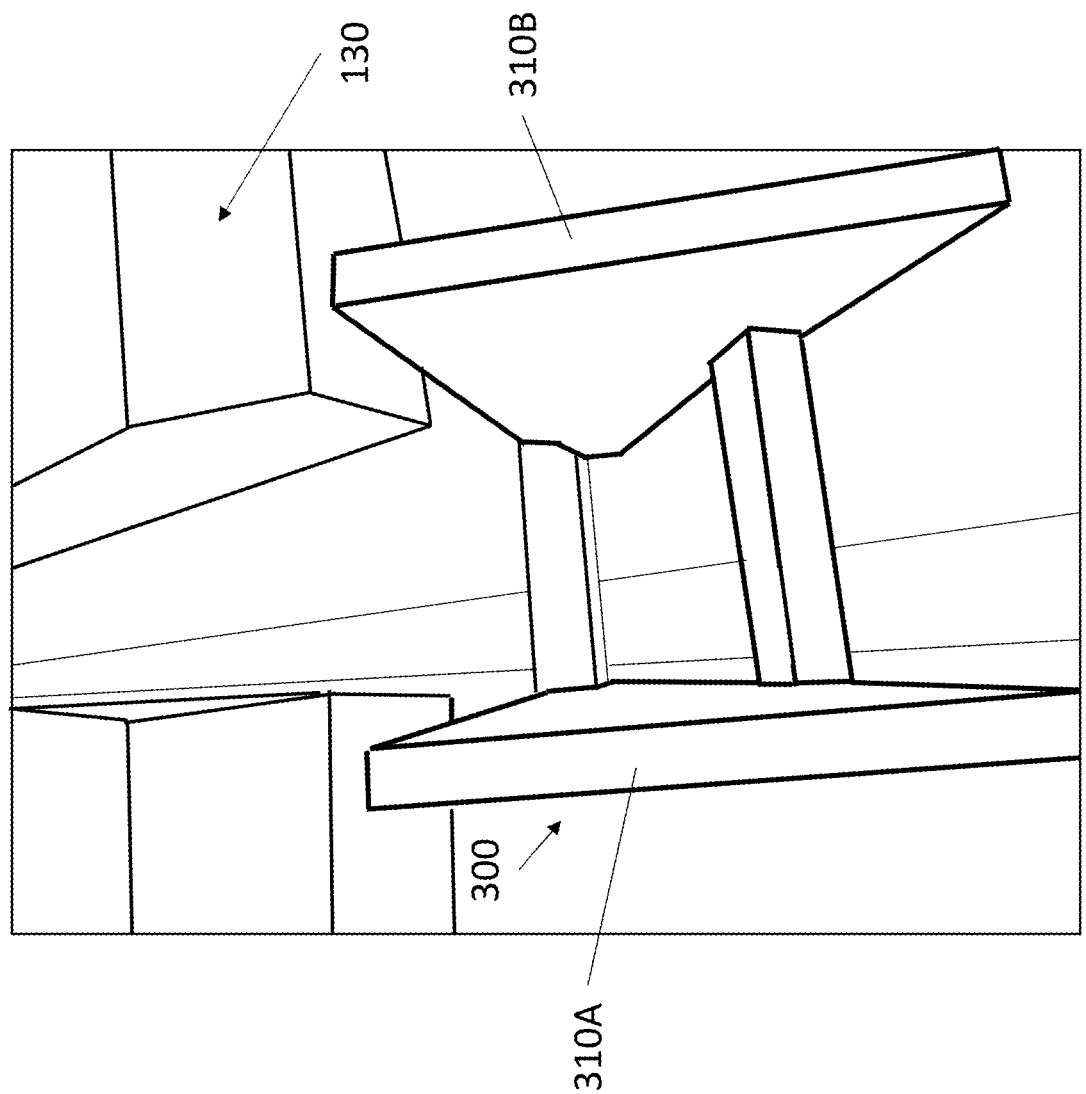
Figure 6C:
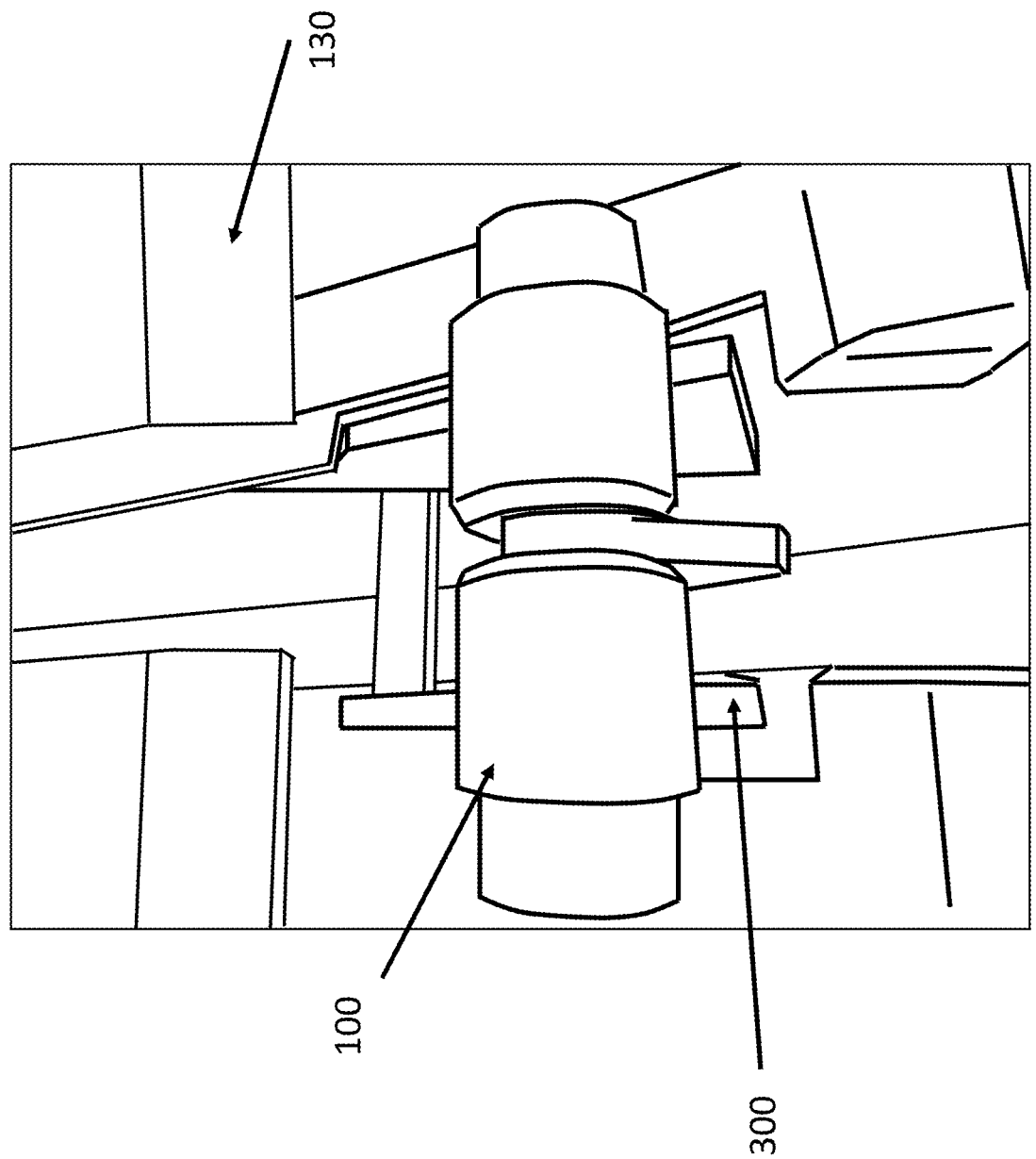

FIG. 6B shows the ramp 300 after it has been pivoted into the raised position. The push roller assemblies may then travel up the ramp, out of the trap door (not shown) and onto the upper track 130. In this regard, FIG. 6C shows a push roller assembly 100 traveling up the ramp 300.

FIGS. 7A-7C shows the ramp 300 pivoting from a lowered position to a raised according to an exemplary embodiment of the present invention. In FIG. 7A, the ramp 300 is in a lowered position, and then as shown in FIG. 7B the ramp 300 may be partially pivoted upward about a shaft 302 by an actuator prior to arrival of a push roller assembly 100 at the ramp site. Further rotation of the ramp 300 by the actuator may then be stopped, and when the push roller assembly 100 contacts the partially raised ramp 300 (FIG. 7C), the endless chain to which the push roller assembly 100 is attached continues to travel in the downstream direction, thereby causing the push roller assembly 100 to further rotate the ramp 300 into the fully raised position (FIG. 7D). The push roller assembly 100 may then continue traveling up the fully raised ramp 300 and onto the upper track 130.

Figure 8A:
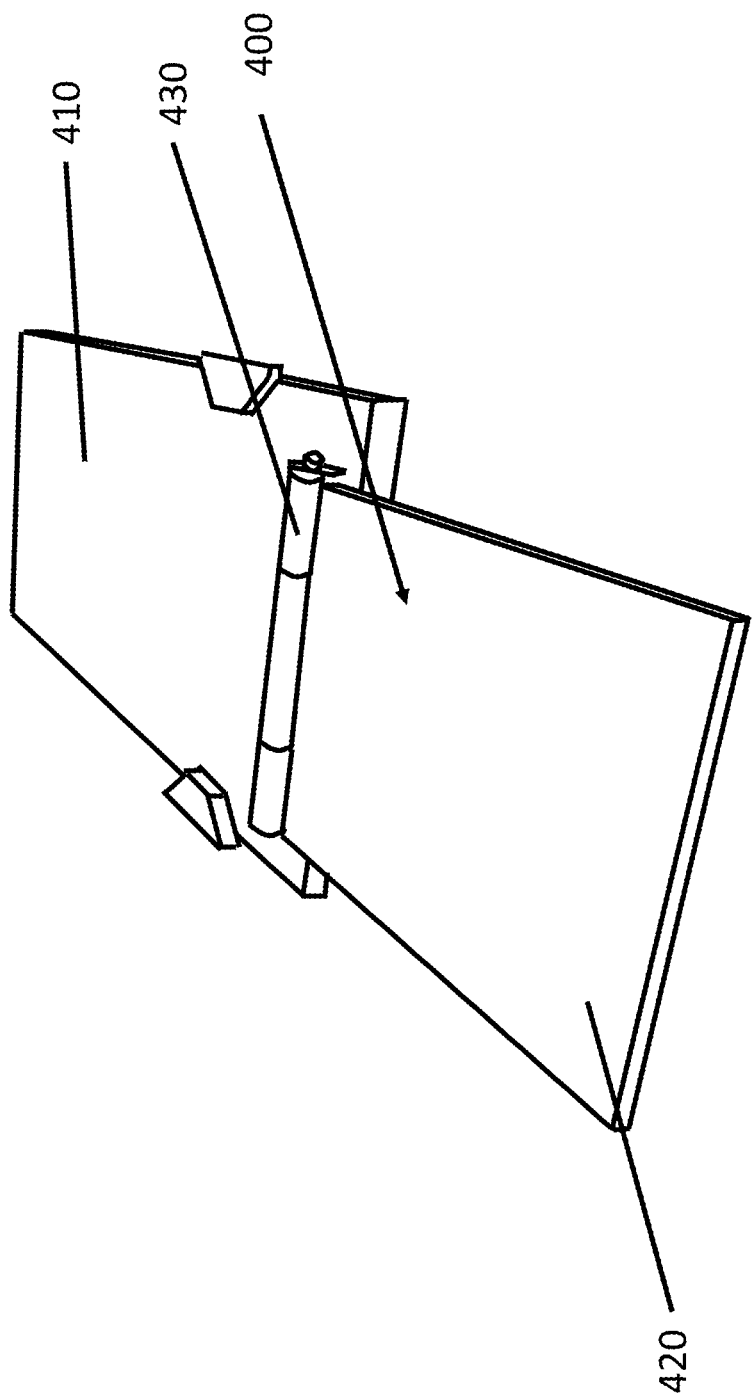
FIGS. 8A and 8B show a trapdoor used in a conveyor system according to an exemplary embodiment of the present invention.
Figure 8B:
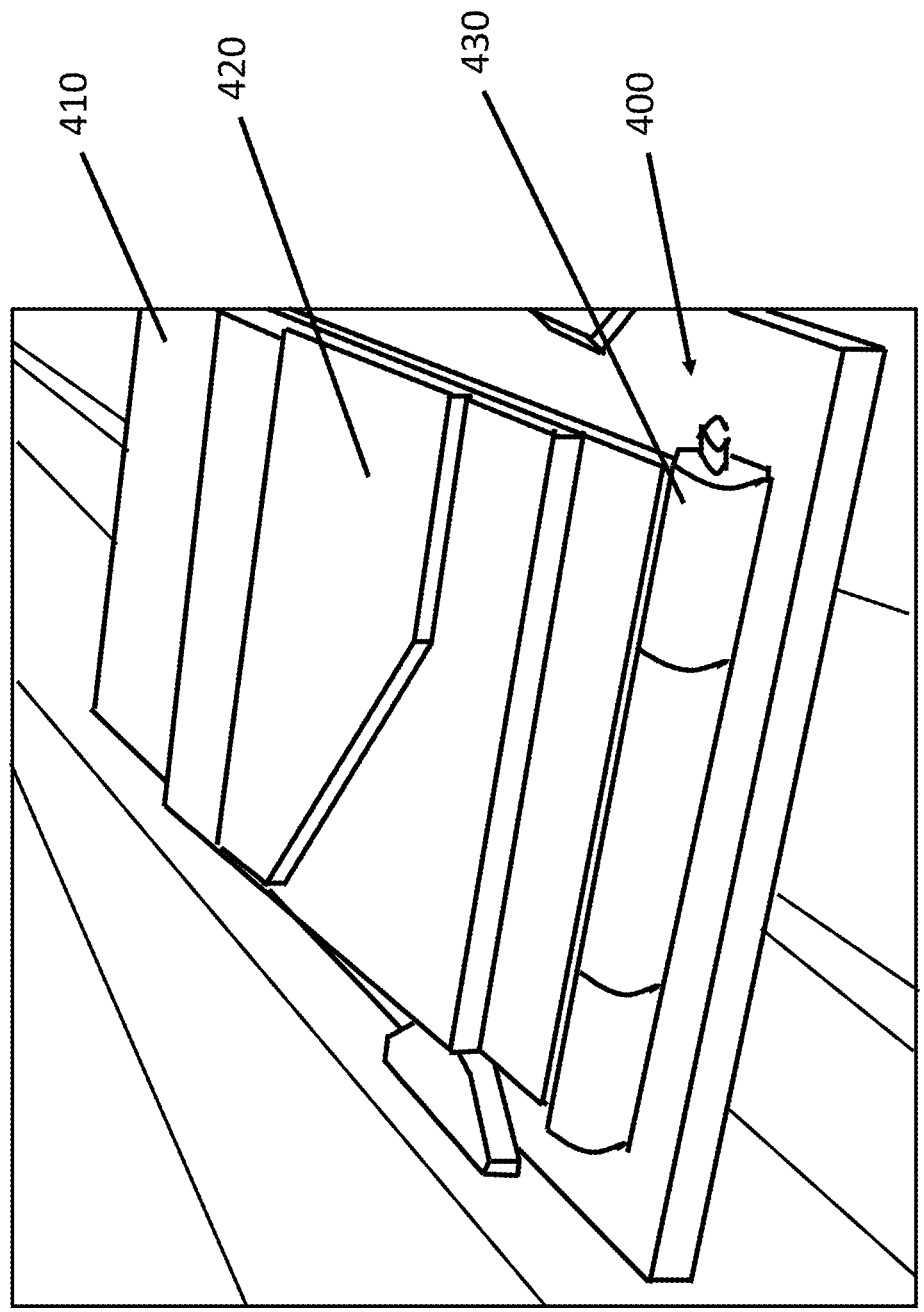

FIGS. 8A and 8B show a trapdoor assembly, generally designated by reference number 400, according to an exemplary embodiment of the present invention. The trapdoor assembly 400 is configured for use with a car wash conveyor system, such as the exemplary conveyor systems described herein. In embodiments, the trapdoor assembly 400 is configured to allow for access to internal components of the conveyor system for maintenance and repair, and also to provide an upper track entry point for the push roller assemblies. The trapdoor assembly 400 includes a rear door 410 and a front door 420. The rear door 410 and front door 420 are hinged together by a double hinge 430. Thus, for examples as shown in FIG. 8B, the front door 420 may be opened upwards and folded over onto the back door 420. Alternatively, as described in more detail below, the front door 420 may be opened downwards relative to the back door 410. The rear portion of the back door 410 is preferably hinged at a fixed point on a frame of the conveyor system.

In typical operation, a push roller assembly may travel up the ramp and into engagement with the front door 420 of the trapdoor assembly 400. Continued progress of the endless chain in the downstream direction causes the push roller assembly to push the front door 420 of the trapdoor assembly 400 upwards via the double hinge 430, thereby allowing the push roller assembly to proceed onto the upper track and into engagement with a vehicle tire.

In some instances, as shown in FIG. 9A, a vehicle may stop too close to the trapdoor assembly 400, resulting in a rear tire 1000 of the vehicle preventing the front door 420 from opening upwards to allow the push roller assembly access to the upper track. However, even in this situation, as shown in FIGS. 9B and 9C, the double hinge 430 allows the trapdoor assembly 400 to continue operating as an entry point for the push roller assembly. Specifically, upon contacting the trapdoor assembly 400, a push roller assembly 100 is pulled further up the ramp 300 by the movement of the endless chain, at which point the front door 420 may be urged upwards into contact with the rear wheel 1000 of the vehicle. At that point, the front door 420 is blocked from further pivoting upwards by the vehicle tire. However, since the rear door 420 is hingedly fixed at point A, the double hinge 430 functions as a fulcrum point at point B, resulting in the rear door 410 pivoting upwards and the front door 420 pivoting downwards relative to the front door 420. As shown in FIG. 9C, continuation of this pivoting action results in the push roller assembly 100 gaining access to the upper track and eventual contact with the vehicle tire 1000, thereby allowing continued normal operation of the conveyor system.

Figure 10:
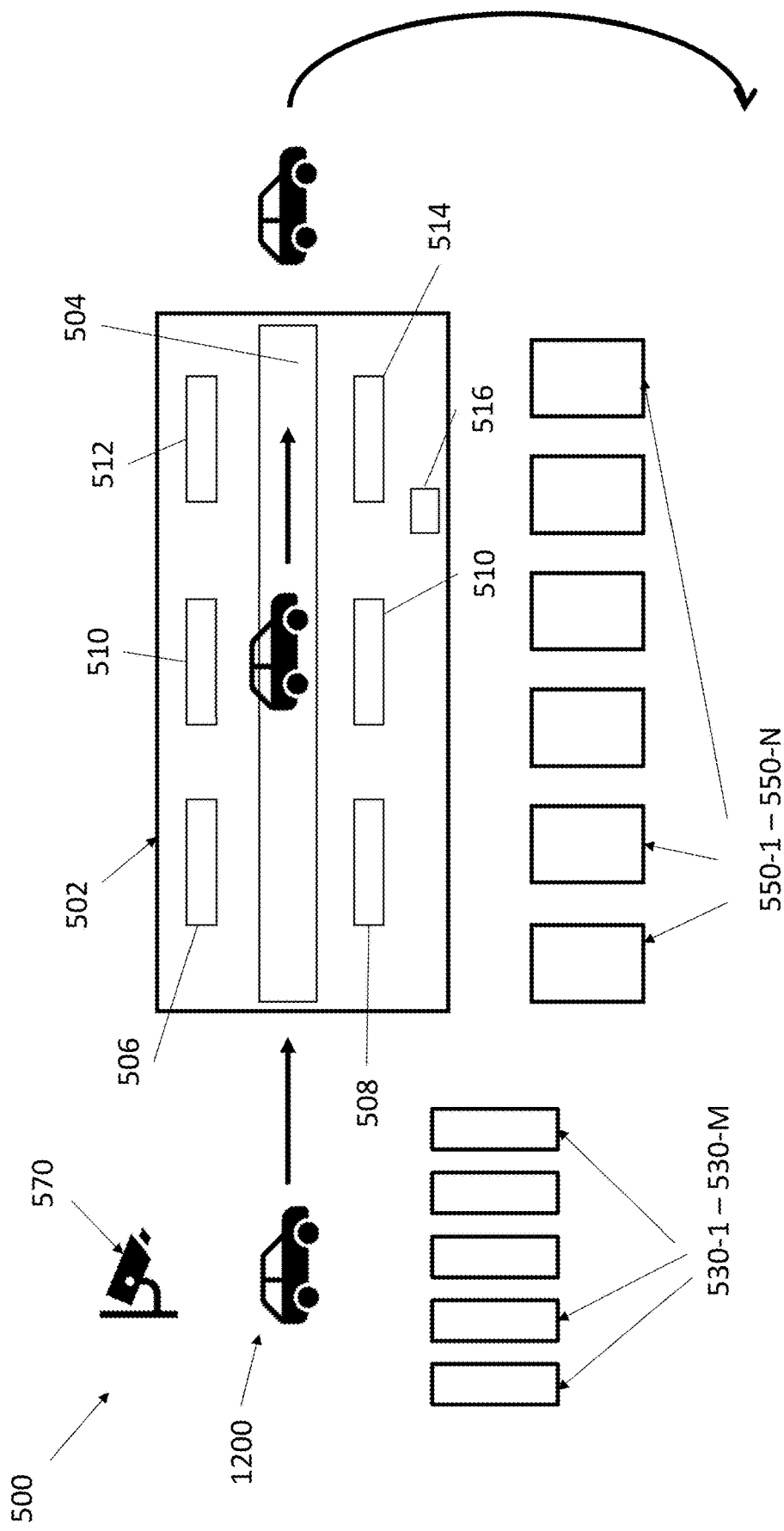
FIG. 10 is a block diagram of an automated car wash system according to an exemplary embodiment of the present invention.

FIG. 10 is a representative diagram of various components of an automated car wash system, generally designated by reference number 500, according to an exemplary embodiment of the present invention. The automated car wash system 500 includes components, such as, for example, a car wash station 502, one or more kiosks 530-1-530-M, and one or more maintenance stations 550-1-550-N, to name a few. As explained in further detail below, an operator/owner of a vehicle 1200 (or other individual associated with a vehicle 1200) may first stop at one of the kiosks 530-1-530-M and scan an associated portable device (e.g., a cell phone, smart phone, tablet, etc.) or otherwise input identification information at the kiosk, and through a dedicated graphical user interface (e.g., as associated with a dedicated application program for display on the associated portable device, a kiosk user interface, etc.) select a desired car wash service, with such selection associated with a number of parameters, such as, for example, type of vehicle (e.g., sport car, truck, hatchback, coupe, etc.), configuration of vehicle (e.g., rear wheel drive, front wheel drive, etc.), and known damage to the vehicle (e.g., broken mirror, broken window glass, damaged headlight, etc.). The vehicle 1200 may then be washed as it proceeds through the car wash station 502, with the various machines within the station 502 being controlled to accommodate the user input information. For example, a particular brush within the station 502 may be inactivated to avoid further damage to a vehicle. In exemplary embodiments, as also explained further below, the automated car wash system 500 may include a vision system 570 that performs functions, such as, for example, confirming that the vehicle 1200 is associated with the user, determining the characteristics of the vehicle 1200, and determining whether there is any damage to the vehicle 1200, to name a few. This additional information gathered by the visions system 1200 may then be used as input to a car wash control system to make any necessary adjustments to the car wash service.

The car wash station 502 may be a building, tunnel or other structure that houses various machines, such as, for example, washers 506, wax applicators 508, brushes 510, blowers 512 and sprayers 514, to name a few. A conveyor 504 within the station 502 moves a vehicle 1200 through the tunnel, preferably in a straight line, for predetermined operation of the machines at predetermined times for automatic washing of the vehicle 1200. In exemplary embodiments, the conveyor 504 may include one or more of the components described herein, such as, for example, tracks, push roller assemblies, ramps, an endless chain, and sprockets, to name a few. The car wash station 502 may also include a car wash station control system 516 configured to perform operations, such as, for example, automatic starting and stopping of the machines/components of the car wash, reconfiguring the machines to accommodate vehicle information, stopping operation of one or more machines in alarm conditions, communicating with input terminals, with the Internet, or with any given computing device such as a personal computer and/or a hand-held computer such as diagnostic equipment, and controlling the lighting and other environmental aspects of the car wash, such as ventilation, draining of run-off fluids, etc., to name a few.

Figure 11:
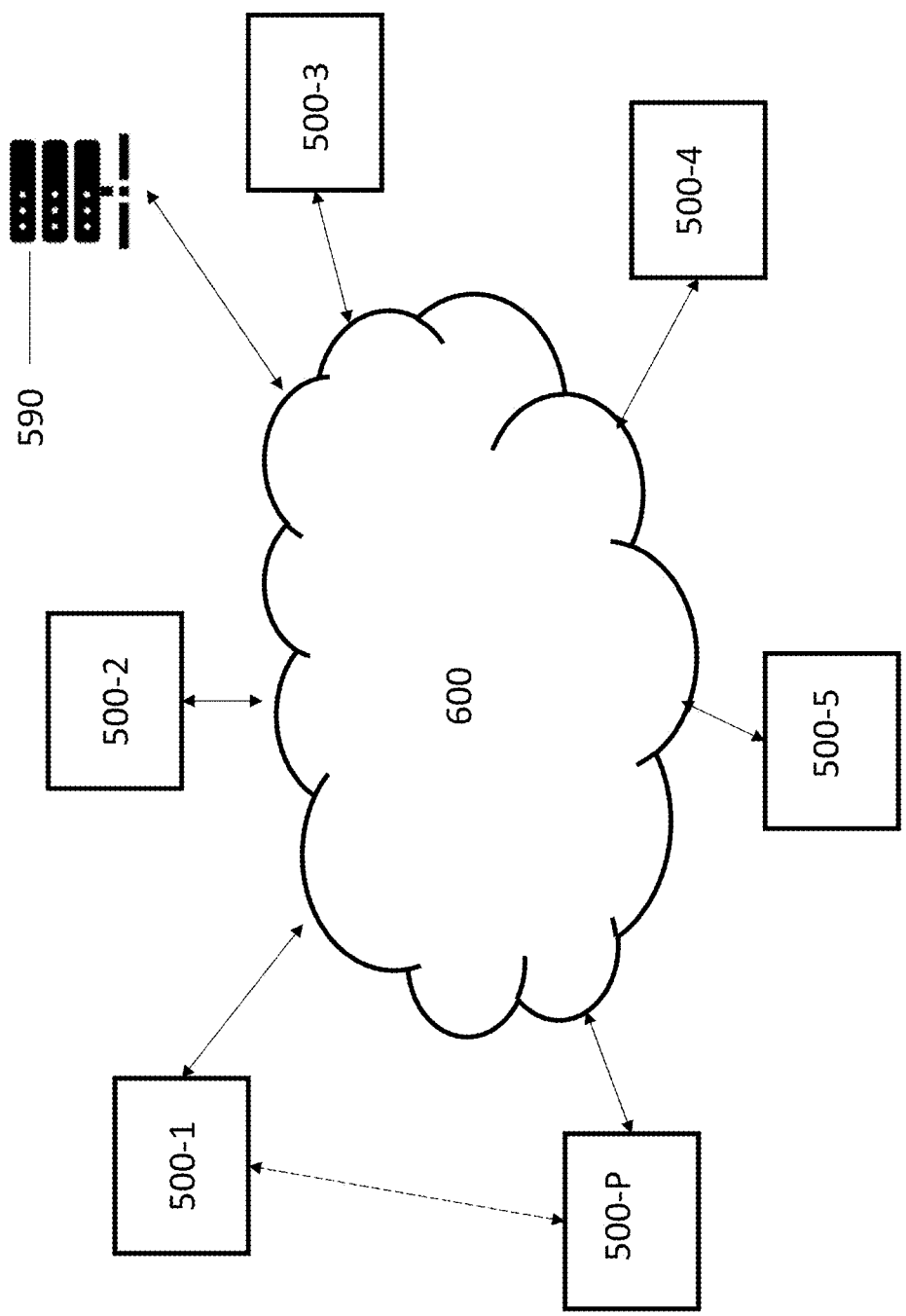
FIG. 11 is a block diagram of an automated car wash computer network according to an exemplary embodiment of the present invention.

As shown in FIG. 11, in embodiments, any number of automated car wash systems 500-1-500-P may be connected to one another and/or to a server 590 over a network 600, such as, for example, the Internet, a LAN, or a WAN, to name a few. The server 590 may include one or more processors and one or more memories. In embodiments, the automated car wash systems 500-1-500-P are clients in a client-server relationship with the server 590. In this regard, the server 590 may provide various functionalities, or "services", such as, for example, sharing data or resources among multiple clients, or performing computation for one or more clients, to name a few. A single server 590 can serve multiple clients, and a single client can use multiple servers 590. A client process may run on the same device or may connect over a network to the server 590 located on a different device. In embodiments, the automated car wash systems 500-1-500-P may be owned and operated by a single entity, or may be owned and operated by different entities.

Figure 12:
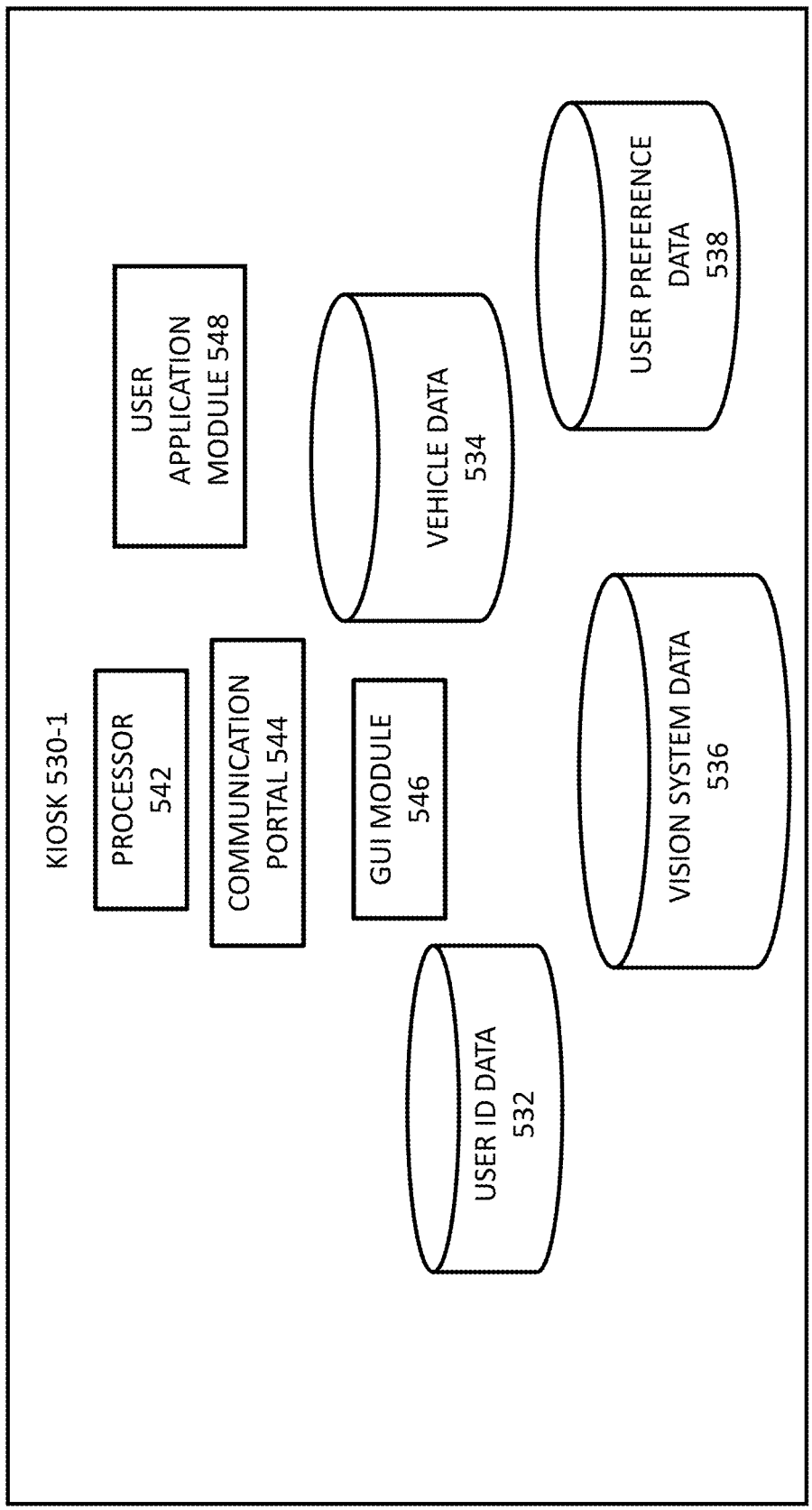
FIG. 12 is a block diagram of a kiosk of an automated car wash system according to an exemplary embodiment of the present invention.

FIG. 12 is a block diagram of a kiosk 530-1 according to an exemplary embodiment of the present invention. The kiosk 530-1 may include computer hardware and/or software components that are configured to receive or otherwise obtain vehicle data through one or more data sources. The kiosk 530-1 may include one or more processors 542 and a communication portal 544 (e.g., for sending and/or receiving data). The one or more processors 542 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The kiosk 530-1 can also include non-transitory computer-readable memory with one or more databases and data stored thereon. The memory may comprise electronic memories such as random-access memory (RAM), read-only memory (ROM), or other types of memory, in any combination. Data stored on the memory can include, for example, user identification data 532, vehicle data 534, vision system data 536, and user preference data 538, to name a few. In embodiments, the user may be the owner and/or operator of the vehicle 1200.

In embodiments, the user identification data 532 may be associated with information regarding identification of the user, such as, for example, a user ID, a password, an account number, a driver's license number, or a credit card number, to name a few. In embodiments, the vehicle data 536 may be associated with information regarding characteristics of the vehicle, such as, for example, type of vehicle (e.g., truck, bus, sports car, hatchback, coupe, to name a few), configuration of vehicle (e.g., rear-wheel drive, front-wheel drive, to name two), and vehicle damage (e.g., broken window, broken side mirror, broken headlight, to name a few), to name a few. In embodiments, the vision system data 536 may be associated with information received from the vision system 570, such as, for example, type of vehicle recognized by the vision system (e.g., truck, bus, sports car, hatchback, coupe, to name a few), vehicle damage recognized by the vision system (e.g., broken window, broken side mirror, broken headlight, to name a few), and confirmation that the vehicle is owned or otherwise associated with the user (e.g., by matching the license plate of the vehicle with the user vehicle registration or by accessing a database of vehicle owners, to name two).

One or more software modules may be stored in the memory and running or configured to run on the one or more processors 542. Such modules can include a GUI module 546, and a user application module 548. The processes performed by such modules, the data produced thereby and/or the data accessed thereby are described herein.

In embodiments, the GUI module 546 may provide a number of screens that allow for user input of information, such as, for example, user ID, credit card information, account number, vehicle type, vehicle configuration, and vehicle damage, to name a few.

In embodiments, the user application module 548 may be configured to allow the user to communicate with the kiosk 530-1 via a dedicated software application program (i.e., an application or "app") installed on the user's portable device. In this regard, the user may generate a unique barcode, such as a QR code, on his/her device, and scan the barcode over a reader installed at the kiosk 530-1. The information contained in the barcode may be used to identify the user and access information associated with the user, such as, for example, account number, payment information, vehicle associated with the user, and car wash preferences, to name a few. In embodiments, the user may then access the kiosk GUI or a GUI on his/her portable device associated with the dedicated app, with some or all of the information automatically filled in based on the reading of the barcode. The user may be provided with the option to modify some or all of the information. For example, if the user recently purchased a new car, the user may change the information associated with the old car to match that of the newly purchased car. As another example, if the vehicle was recently damaged, the user may input information to notify the system of the vehicle damage.

In embodiments, the kiosk 530-1 and/or the app may process payment for the car wash services based on the user information, such as, for example, credit card information, debit card information, and account balance information, to name a few. The kiosk 530-1 and/or the app may then generate a receipt and/or an updated account balance for the user.

In embodiments, the kiosk 530-1 and/or the app may confirm identity of the user by matching the vehicle information as gathered by the vision system 570 with that of the user information input through the app and/or the kiosk 530-1.

Figure 13:
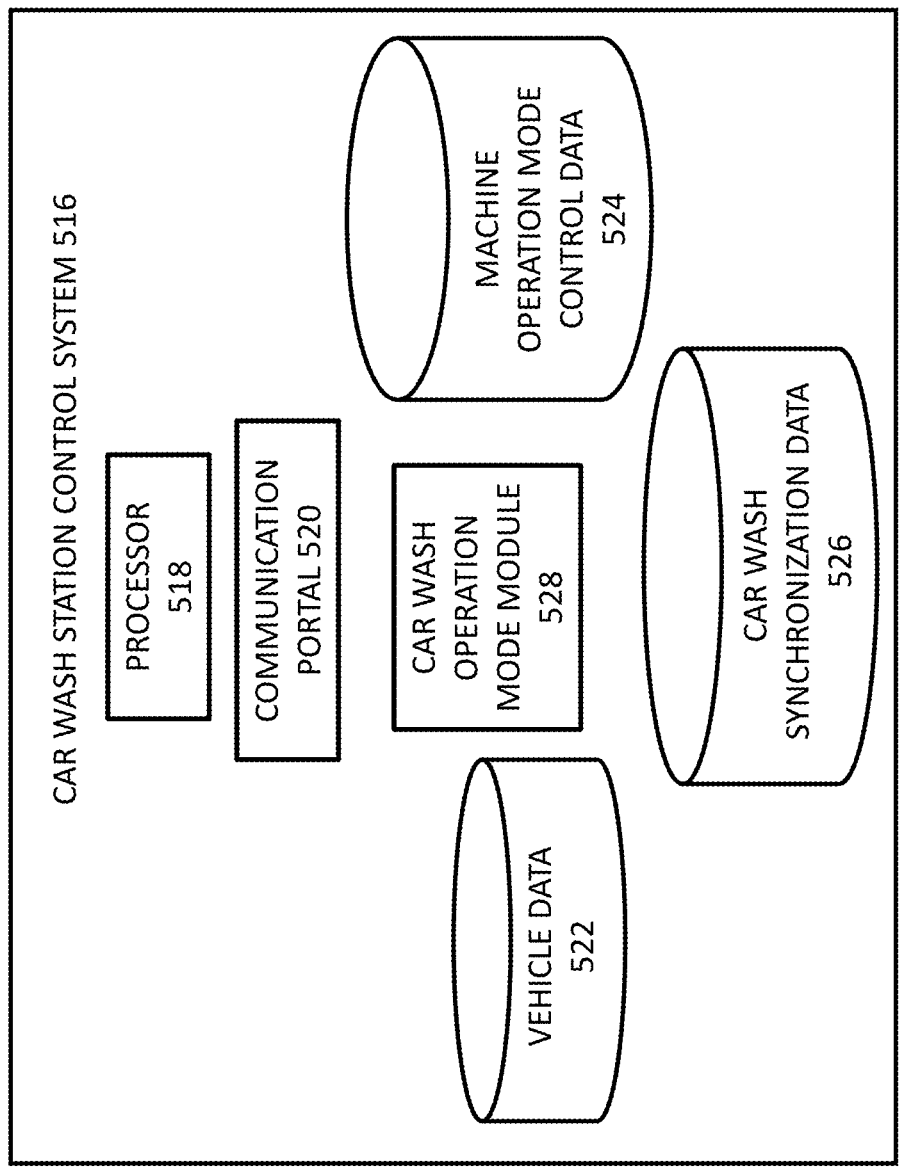
FIG. 13 is a block diagram of a car was station control system of an automated car wash system according to an exemplary embodiment of the present invention.

FIG. 13 is a block diagram of a car wash station control system 516 according to an exemplary embodiment of the present invention. The car wash station control system 516 may include computer hardware and/or software components that are configured to receive or otherwise obtain car wash operation mode data and operate the various machines of the car wash station 500 based on the car wash operation mode data. The car wash station control system 516 may include one or more processors 518 and a communication portal 520 (e.g., for sending and/or receiving data). The one or more processors 518 may include one or more processing devices such as, for example, a microprocessor, a microcontroller, an application-specific integrated circuit (ASIC), a field programmable gate array (FPGA) or other type of processing circuitry, as well as portions or combinations of such circuitry elements. The car wash station control system 516 can also include non-transitory computer-readable memory with one or more databases and data stored thereon.

The memory may comprise electronic memories such as random-access memory (RAM), read-only memory (ROM), or other types of memory, in any combination. Data stored on the memory can include, for example, vehicle data 532, machine operation mode instructions data 524, and car wash synchronization data 526, to name a few. One or more software modules may be stored in the memory and running or configured to run on the one or more processors 518. Such modules can include a car wash operation mode module 528. The processes performed by such modules, the data produced thereby and/or the data accessed thereby are described herein.

In embodiments, the car wash operation mode module 528 may receive or otherwise obtain vehicle data 532 from one or more of the kiosks 530-1-530-M or as already stored in memory, where such vehicle data is associated with a vehicle 1200, and automatically generate updated operating mode instructions for one or more of the machines within the car wash station 502 to accommodate the vehicle data. For example, if the vehicle data 532 is associated with information that the vehicle 1200 is damaged, the updated operation mode instructions may result in deactivation or altered operation of one or more of the machines to avoid further damage to the vehicle 1200 during the particular wash sequence associated with the vehicle 1200. As another example, if the vehicle data 532 is associated with a desired service, such as, for example, undercoating, waxing, or preferred cleaning agent, to name a few, the updated operation mode instructions may result in appropriate adjustments to operation of one or more of the machines to accommodate the desired service.

Figure 14:
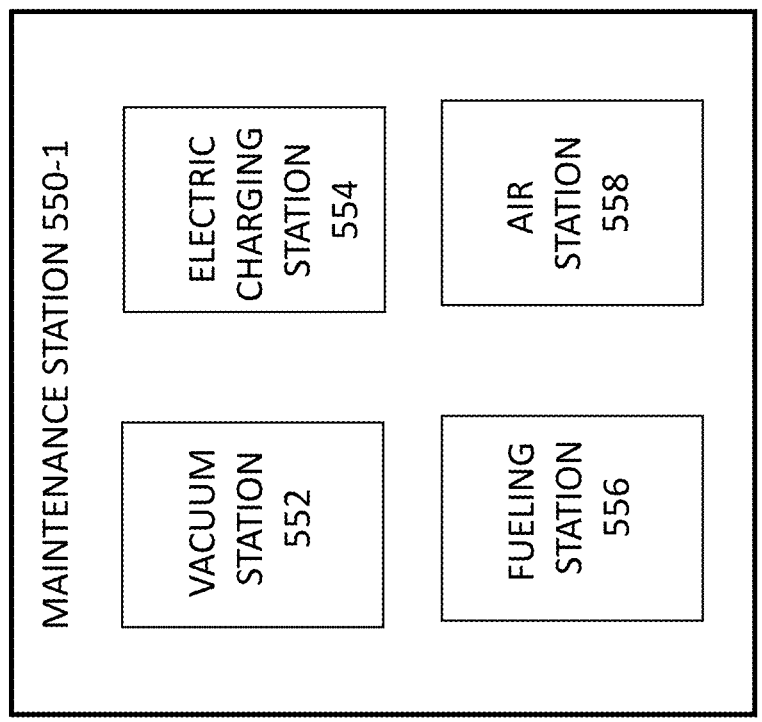
FIG. 14 is a block diagram of a maintenance station of an automated car wash system according to an exemplary embodiment of the present invention.

FIG. 14 is a block diagram of a maintenance station 550-1 according to an exemplary embodiment of the present invention. The maintenance station 550-1 may include components, such as, for example, a vacuum station 552, an electric charging station 554, a fueling station 556, and a pressurized air station 558, to name a few. The vacuum station 552 may include components such as, for example, a vacuum source, a vacuum hose, and vacuum brushes, to name few, for use to vacuum the interior of the vehicle 1200. The electric charging station 554 may include components, such as, for example, an electric power source, electric cables, and electric outlets, to name a few, for charging an electric vehicle. The fueling station 556 may include components, such as, for example, one or more gas pumps for fueling a gas-powered vehicle, gas hoses, and automated payment interfaces, to name a few. The pressurized air station 558 may include components, such as, for example, a source of pressurized air for inflating vehicle tires and/or for blowing debris off or out of the vehicle, air hoses, and air pressure gauges, to name a few. The components of the maintenance station 550-1 are not limited to those described herein, and in embodiments any number and type of components may be provided at the maintenance station 550-1.

In embodiments, the vision system 570 may include components such as, for example, an industrial camera, an image sensor, a visions processor, a communication interface, a light source, and a lens, to name a few. Any known vision system may be used to carry out the processes in accordance with exemplary embodiments of the present invention, such as vision systems available from FSI Technologies Inc. (Lombard, Illinois, USA). In embodiments, the vision system 570 may employ artificial intelligence to recognize characteristics of a vehicle, such as, for example, type of vehicle, size of vehicle, and vehicle damage, to name a few.

FIG. 15 is a flow chart for a process of automatically washing a vehicle at a car wash in accordance with an exemplary embodiment of the present invention. In step S01 of the process, the system 500 may receive vehicle and/or user identification data. In this step, as discussed above, a user may scan a QR code or other type of barcode generated on the user's personal device over a reader at a kiosk 530-1. The kiosk 530-1 may then be able to determine the user identification data based on the scanned code. Alternatively, the user may input identification information at a GUI provided at the kiosk 530-1 or within a dedicated app on the user's personal device.

In step S03, the system 500 determines whether the vehicle and/or user identification data is associated with an account. If no account is recognized, the system 500 may prompt the user to open an account (step S05). In this regard, either at the kiosk 530-1 or the app, the user may be prompted to input additional information, such as, for example, a unique user ID, a password, vehicle information, payment information and default car wash preferences, to name a few, so as to complete an account profile. After an account is opened, or the system 500 recognizes an account associated with the user/vehicle, the process may proceed to step S07.

In step S07, the system 500 accesses or otherwise obtains car wash preference data for the particular user/vehicle. This step may involve the system 500 accessing user default preferences stored in memory and/or requesting the user to input specific information regarding the current car wash service, such as, for example, whether there is any new damage to the vehicle, whether there are any revisions to prior default preferences, and whether there are any new preferences compared to the default preferences.

In step S09, the system 500 may generate machine operation mode instruction data based on the car wash preference data. This step may involve the car wash station control system 516 generating control instructions for one or more of the machines at the car wash station 502 to accommodate the car wash preference data. For example, control instructions may be generated that result in modifying the speed of operation of one or more machines, deactivation of one or more machines, or altering the sequence of operation of one or more machines, to name a few.

In step S11, the system 500 carries out the car wash service in accordance with the generated machine operation mode instruction data.

While in the foregoing specification a detailed description of a specific embodiment of the invention was set forth, it will be understood that many of the details herein given may be varied considerably by those skilled in the art without departing from the spirit and scope of the invention.

The invention claimed is:

1. A car wash vehicle conveyor system comprising:
 a lower track, an upper track, and an intermediate track positioned between the lower and upper tracks, the upper track comprising laterally spaced and parallel raised portions;
 an endless chain extending around the lower track and the intermediate track;
 at least one drive sprocket around which the endless chain is connected so that rotation of the at least one drive sprocket results in lateral movement of the endless chain around the lower and intermediate tracks;
 a plurality of push roller assemblies each attached to the endless chain and comprising at least one pair of rollers, each push roller assembly being sized so that, when the push roller assembly is directed onto the upper track, the corresponding rollers travel along the upper track between the raised portions; and a trapdoor assembly disposed above an entry point of the plurality of push roller assemblies from the intermediate track to the upper track, the trapdoor assembly comprising a rear door and a front door disposed downstream from the rear door, and a double hinge between the front and rear doors.

2. The car wash vehicle conveyor system of claim 1, wherein each push roller assembly has a width measured from an outer edge of one roller to an outer edge of another roller of the at least one pair of rollers, and the width is ten inches.

3. The car wash vehicle conveyor system of claim 1, wherein each push roller assembly comprises at least one pair of collars, and each collar is configured to hold a corresponding one of the rollers on the push roller assembly.

4. The car wash vehicle conveyor system of claim 3, wherein each push roller assembly is sized so that, when the push roller assembly is directed onto the upper track, each collar rides on top of the raised portions of the upper track.

5. The car was vehicle conveyor system of claim 1, further comprising a ramp having a raised configuration in which the plurality of push roller assemblies are directed by the ramp onto the upper track and a lowered configuration in which the plurality of push roller assemblies are directed by the ramp onto the intermediate track.

6. The car wash vehicle conveyor system of claim 5, further comprising an actuator that rotates the ramp to an intermediate configuration between the lowered and raised configuration.

7. The car wash vehicle conveyor system of claim 6, wherein the ramp is further rotated from the intermediate configuration to the raised configuration due to contact of one of the plurality of push roller assemblies with the ramp.

8. The car wash vehicle conveyor system of claim 1, wherein the sprocket comprises a pair of flanges and the endless chain is held between the pair of flanges.

\* \* \* \* \*